(12) United States Patent
Lamorte et al.

(10) Patent No.: US 10,379,385 B2
(45) Date of Patent: Aug. 13, 2019

(54) HEAD ALIGNMENT EYEWEAR DEVICES FOR SPORTS APPLICATIONS AND METHODS OF USING THE SAME

(71) Applicant: EyeLoc Head Gear LLC, Pawling, NY (US)

(72) Inventors: Vincent Lamorte, Pawling, NY (US); Mark Zander, Pawling, NY (US); Anthony Vos, Holmes, NY (US); Vito Lamorte, Pawling, NY (US)

(73) Assignee: EYELOC HEAD GEAR LLC, Pawling, NY (US)

( * ) Notice: Subject to any disclaimer, the term of this patent is extended or adjusted under 35 U.S.C. 154(b) by 21 days.

(21) Appl. No.: 14/780,741

(22) PCT Filed: Apr. 7, 2014

(86) PCT No.: PCT/US2014/033212
§ 371 (c)(1),
(2) Date: Nov. 20, 2015

(87) PCT Pub. No.: WO2014/165857
PCT Pub. Date: Oct. 9, 2014

(65) Prior Publication Data
US 2016/0124247 A1    May 5, 2016

Related U.S. Application Data

(60) Provisional application No. 61/929,489, filed on Jan. 20, 2014, provisional application No. 61/853,435, filed on Apr. 5, 2013.

(51) Int. Cl.
*G02C 7/16* (2006.01)
*G02C 5/04* (2006.01)
(Continued)

(52) U.S. Cl.
CPC ............. *G02C 7/16* (2013.01); *G02C 5/045* (2013.01); *G02C 7/101* (2013.01); *G02C 7/104* (2013.01);
(Continued)

(58) Field of Classification Search
CPC .......... G02C 5/003; G02C 5/04; G02C 5/045; G02C 7/021; G02C 7/028; G02C 7/10;
(Continued)

(56) References Cited

U.S. PATENT DOCUMENTS

| 1,637,406 A | 7/1922 | Brumder |
| 1,683,505 A | 9/1928 | Walker |

(Continued)

FOREIGN PATENT DOCUMENTS

| CN | 2844961 Y | * 12/2006 | ............... G02C 7/10 |
| GB | 2489768 | 10/2012 | |

(Continued)

*Primary Examiner* — Robert E. Tallman
(74) *Attorney, Agent, or Firm* — Helsin Rothenberg Farley & Mesiti P.C.

(57) ABSTRACT

An optical viewing device, consisting of glasses, goggles, visor or other head-worn device, comprised of a vertical aperture, or apertures, designed to limit an athlete's visual field of view and increase the user's focus on the ball position. In this manner, the athlete's eye to ball alignment is enhanced, leading to reduced head movements during use. The improved performance is directly enhanced by the improved eye-ball alignment and reduced head movement during the sporting activity.

16 Claims, 17 Drawing Sheets

(51) Int. Cl.
*G02C 7/10* (2006.01)
*G02C 7/12* (2006.01)

(52) U.S. Cl.
CPC ............ *G02C 7/12* (2013.01); *G02C 2200/08* (2013.01); *G02C 2200/18* (2013.01)

(58) Field of Classification Search
CPC .......... G02C 7/104; G02C 7/16; G02C 7/165; G02C 13/003; G02C 13/005; G02C 2202/06; G02C 7/101; G02C 7/027; A61B 3/111; A61B 3/113
USPC .... 351/45, 46, 124, 128, 140, 148, 149, 204
See application file for complete search history.

(56) References Cited

U.S. PATENT DOCUMENTS

| | | | |
|---|---|---|---|
| 2,012,574 A * | 8/1935 | Mandaville | A61B 3/111 |
| | | | 33/200 |
| 2,663,021 A * | 12/1953 | Douglass | G02C 7/16 |
| | | | 2/433 |
| 2,677,894 A * | 5/1954 | Belgard | A61B 3/04 |
| | | | 33/200 |
| 3,729,199 A | 4/1973 | Granberg | |
| 4,022,475 A * | 5/1977 | Todd | A63B 69/3608 |
| | | | 2/13 |
| 4,168,111 A | 9/1979 | Baines | |
| 4,810,080 A | 3/1989 | Grendol et al. | |
| 4,824,234 A | 4/1989 | Sparks et al. | |
| 4,991,849 A | 2/1991 | Fabanich | |
| 5,076,665 A * | 12/1991 | Petersen | G02C 5/045 |
| | | | 351/159.39 |
| 5,355,182 A * | 10/1994 | Barbera | A61F 9/022 |
| | | | 351/159.48 |
| 5,375,844 A | 12/1994 | Waud | |
| D359,060 S | 6/1995 | Sherlock et al. | |
| 5,444,501 A | 8/1995 | Aloi et al. | |
| D365,357 S | 12/1995 | Jannard et al. | |
| 5,675,398 A * | 10/1997 | Moore | G02C 7/16 |
| | | | 351/45 |
| 5,987,653 A | 11/1999 | Cyr | |
| D428,620 S | 7/2000 | Maturapom | |
| D429,751 S | 8/2000 | Garrity et al. | |
| D433,697 S | 11/2000 | Lane | |
| 6,386,702 B1 | 5/2002 | Maloncon | |
| 6,558,266 B2 | 5/2003 | McMahon | |
| 7,048,371 B1 * | 5/2006 | Moore | G02C 5/00 |
| | | | 351/103 |
| D565,082 S | 3/2008 | McClure et al. | |
| 7,370,960 B2 * | 5/2008 | Pfund | A63B 69/3608 |
| | | | 351/44 |
| D660,902 S | 5/2012 | Johnson | |
| 8,677,517 B1 | 3/2014 | Morency et al. | |
| 2004/0012758 A1* | 1/2004 | Lin | G02C 7/14 |
| | | | 351/203 |
| 2007/0293332 A1 | 2/2007 | Cranston et al. | |
| 2008/0030678 A1 | 2/2008 | Koops | |
| 2008/0165319 A1 | 7/2008 | Wang | |
| 2010/0234942 A1* | 9/2010 | Peyman | A61F 2/1613 |
| | | | 623/6.17 |
| 2011/0085127 A1 | 4/2011 | Wada | |
| 2012/0258814 A1 | 10/2012 | Kayama | |

FOREIGN PATENT DOCUMENTS

| | | |
|---|---|---|
| JP | 2005125103 | 5/2005 |
| WO | WO2004107022 | 12/2004 |

* cited by examiner

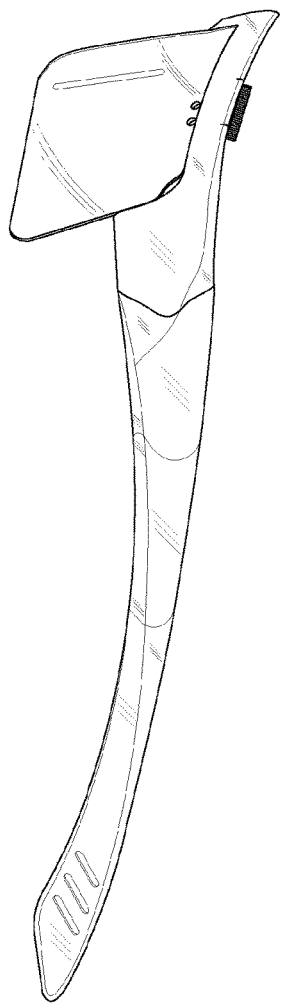 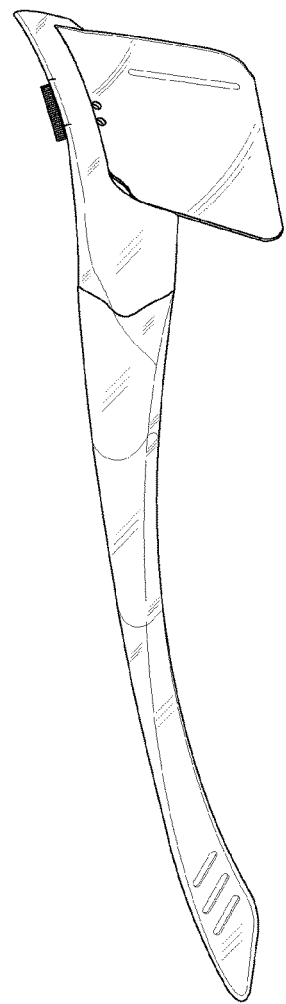
FIG. 7D                    FIG. 7E

HEAD ALIGNMENT EYEWEAR DEVICES FOR SPORTS APPLICATIONS AND METHODS OF USING THE SAME

FIELD OF THE INVENTION

The invention relates eyewear devices and systems for sports applications and methods of using the same.

BACKGROUND OF THE INVENTION

In nearly all sport activities that use a ball, the need for eye-hand coordination and eye-ball alignment are critical features for success. Many international sports require the use of a ball and some examples of these sports are golf, baseball, basketball, tennis, soccer, football, cricket and others. In many of these sports, the ability to focus on the ball or other object(s) is essential for success and athletes often refer to their successful performance and results as "seeing the ball" well.

Methods for training athletes normally require significant hours of practice and years of activity to reach high levels of success. For most weekend athletes, devoting numerous hours to the sport of their choice is difficult at best, and thus, their performance in the sport can suffer; poor performance often results in reduced activity and a lack of desire to compete in that sport.

Methods for rapidly training young athletes with high potential, professional athletes and 'weekend' athletes equally have significant commercial potential. Any device or method that enhances athletic performance can significantly enhance the player's experience and desire to continue to pursue that sport. This is especially true for young athletes and weekend athletes.

New devices and unique methods are often required to increase athletic performance, regardless of the specific sport.

SUMMARY OF THE INVENTION

The invention relates to eyewear devices and methods of using the same to assist users enhance their sports abilities.

One embodiment of the invention relates to an eyewear device comprising:
 (i) an eyewear frame;
 (ii) a right lens and a left lens attached to the eyewear frame; and
 (iii) an adjustment assembly,
wherein the right lens and the left lens each comprise at least one transparent region within the lens providing an optically differentiated field of view or limited optical field of view there through and wherein the adjustment assembly is adapted to horizontally adjust each of the at least one transparent region to align with a user's eye pupils and inter-pupillary distance.

Another embodiment of the invention relates to an eyewear device comprising:
 (a) an eyewear frame; and
 (b) a right lens and a left lens attached to the eyewear frame;
wherein the right lens and the left lens each comprise at least one transparent region within the lens providing an optically differentiated field of view (or limited optical field of view) there through to align with a user's eye pupils and inter-pupillary distance.

Another embodiment relates to an eyewear device comprising an eyewear frame supporting a right lens and a left lens, wherein the right lens and the left lens each include at least one transparent region that can be horizontally adjusted to align with the inter-pupillary distance of a user and thereby provide an optically differentiated field of view for the user through each of the at least one transparent region.

Another embodiment of the invention relates to an eyewear device comprising:
 (i) an eyewear frame;
 (ii) a right lens and a left lens attached to the eyewear frame; and
 (iii) an adjustment assembly for each lens, each adjustment assembly comprising a movable component adapted to hold each lens,
wherein the right lens and the left lens each comprise at least one transparent region providing an optically differentiated field of view there through and wherein each movable component is adapted to horizontally adjust each lens thereby aligning each transparent region with a user's eye pupils.

Another embodiment relates to a lens assembly for an eyewear system, the lens assembly including a right transparent vertical viewing region and a left transparent vertical viewing region, wherein the right transparent viewing region and the left transparent viewing region are configured to be horizontally adjusted to align with a user's eye pupils and inter-pupillary spacing. Preferably, each transparent vertical viewing region is centered within the left and right lens of the eyewear system.

Another embodiment relates to an eyewear device comprising a right lens and a left lens, wherein the right lens and the left lens each comprise a vertically aligned transparent regions providing an optically differentiated field of view there through, wherein the vertically aligned transparent regions comprises at least three vertically aligned transparent regions.

The foregoing has outlined some of the aspects of the present invention. These objects should be construed as being merely illustrative of some of the more prominent features and applications of the invention. Many other beneficial results can be obtained by modifying the embodiments within the scope of the invention. Accordingly other objects and a full understanding of the invention may be had by referring to this summary of the invention, the detailed description describing the preferred embodiments in addition to the scope of the invention defined by the claims taken in conjunction with the accompanying drawings. The unique features characteristic of this invention and operation will be understood more easily with the description and drawings. It is to be understood that the drawings are for illustration and description but does not define the limits of the invention.

BRIEF DESCRIPTION OF THE INVENTION

The abovementioned and other features of the inventions disclosed herein are described below with reference to the drawings of the preferred embodiments. The illustrated embodiments are intended to illustrate, but not to limit the inventions. The drawings contain the following figures.

Figure 7A:
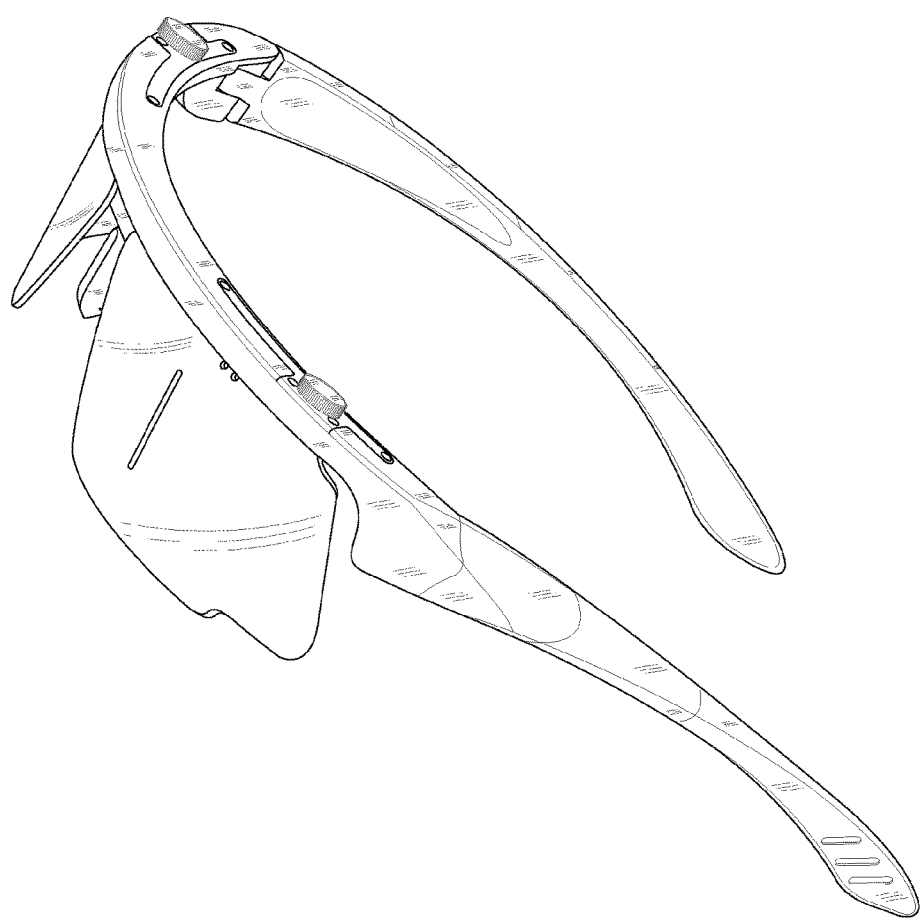
FIG. 7A is side view of a design of an eyewear device for improved athlete-ball alignment, reduced head movement and/or eye movement, increased focus on the ball, and improved performance.
Figure 7B:
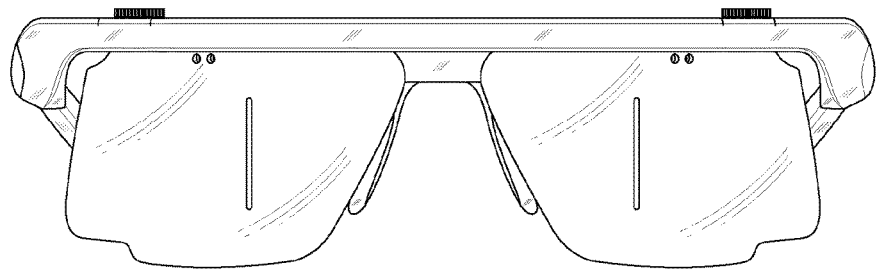
Figure 7C:
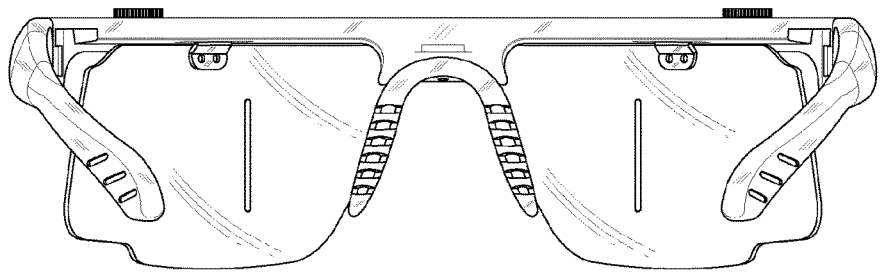

FIG. 7B is a front view of the design of FIG. 7A.
FIG. 7C is a back view of the design of FIG. 7A.
FIG. 7D is a left-side view of the design of FIG. 7A.
FIG. 7E is a right-side view of the design of FIG. 7A.

Figure 8A:
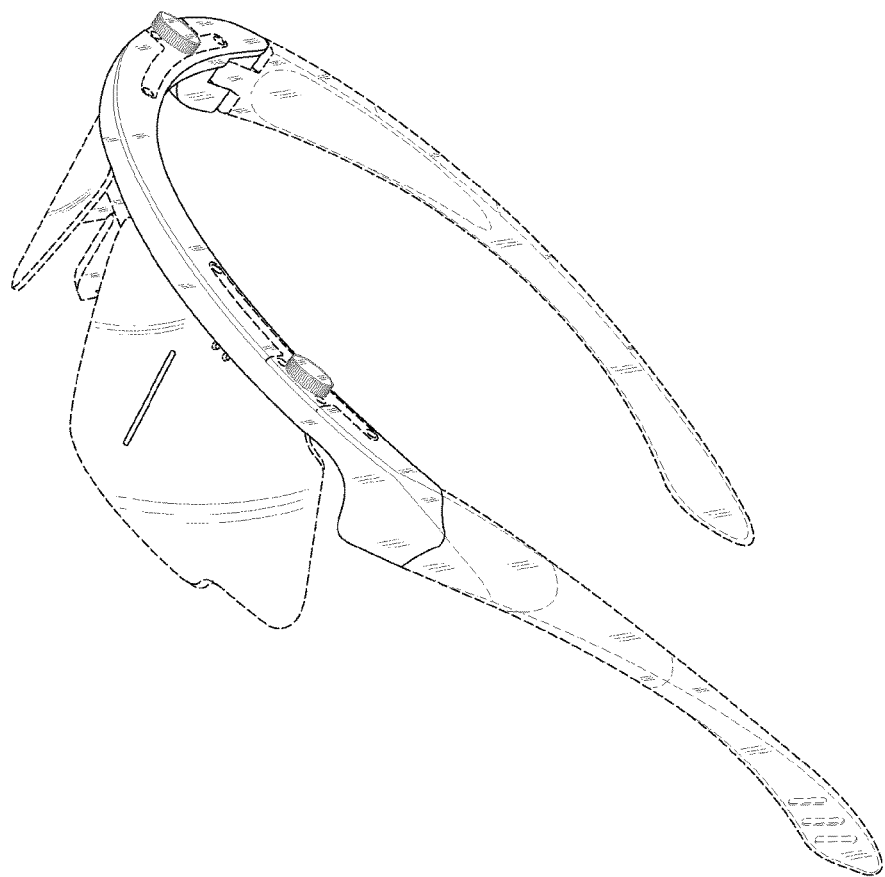

FIG. 8A is side view of another design of an eyewear device for improved athlete-ball alignment, reduced head movement and/or eye movement, increased focus on the ball, and improved performance.

Figure 8B:
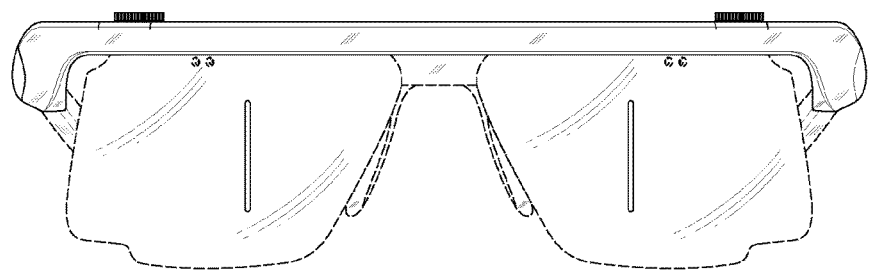
Figure 8C:
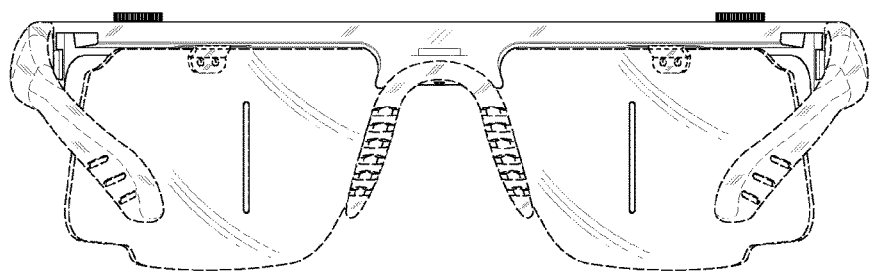
Figures 8D, 8E:
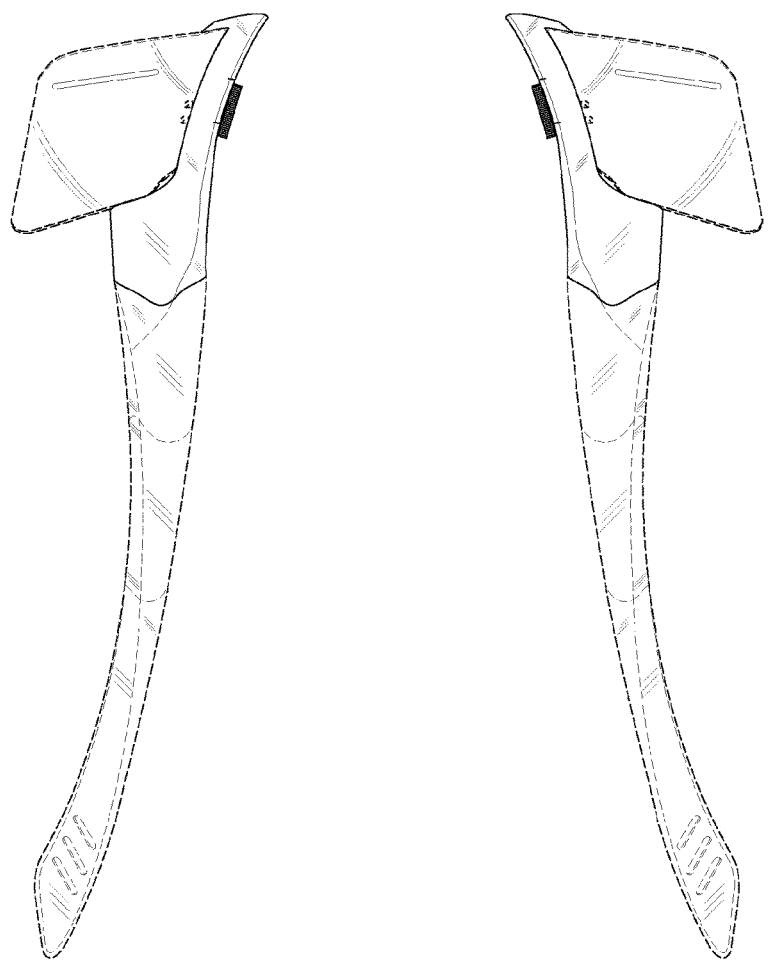

FIG. 8B is a front view of the design of FIG. 8A.
FIG. 8C is a back view of the design of FIG. 8A.
FIG. 8D is a left-side view of the design of FIG. 8A.
FIG. 8E is a right-side view of the design of FIG. 8A.

Figure 9A:
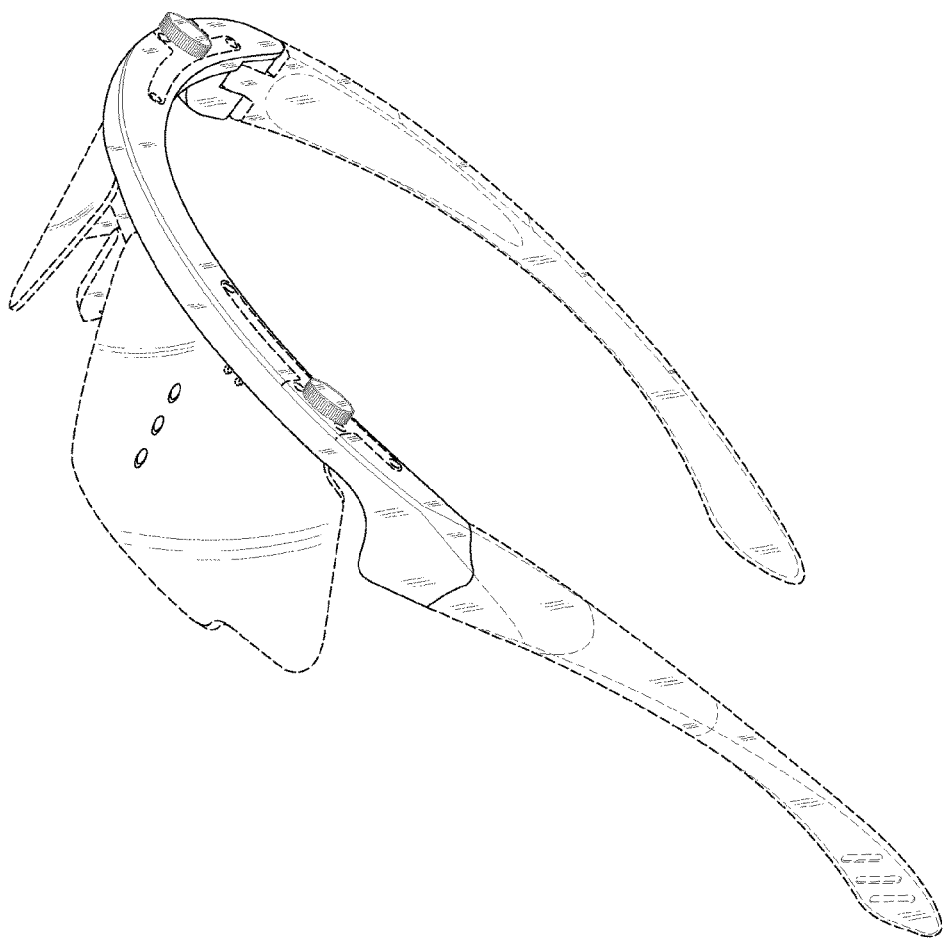

FIG. 9A is side view of another design of an eyewear device for improved athlete-ball alignment, reduced head movement and/or eye movement, increased focus on the ball, and improved performance.

Figure 9B:
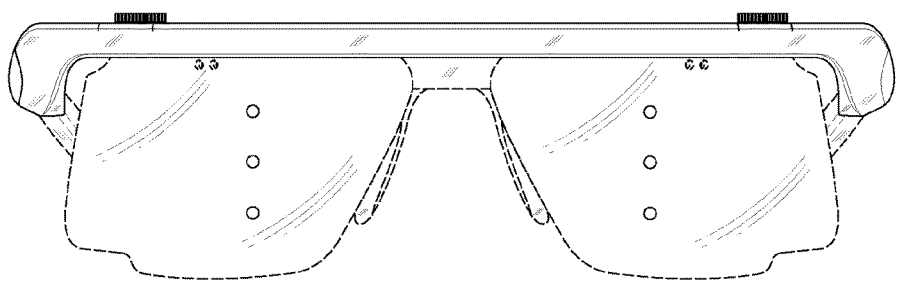
Figure 9C:
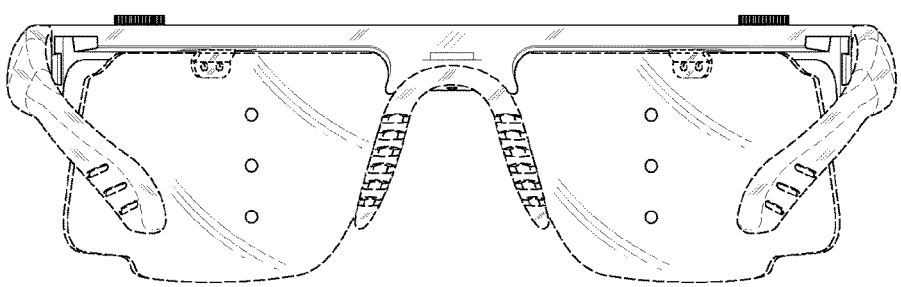
Figure 9D:
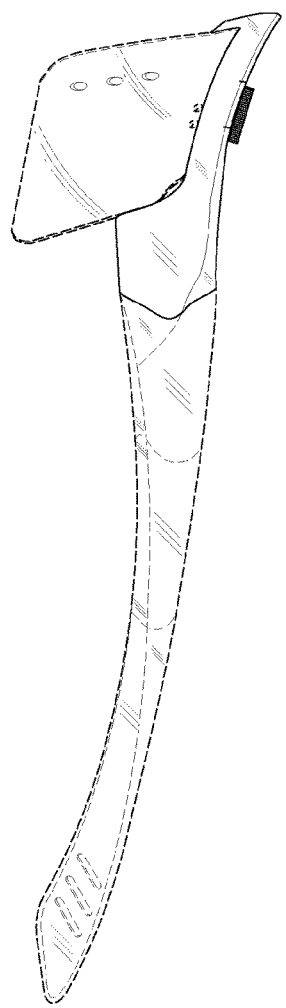
Figure 9E:
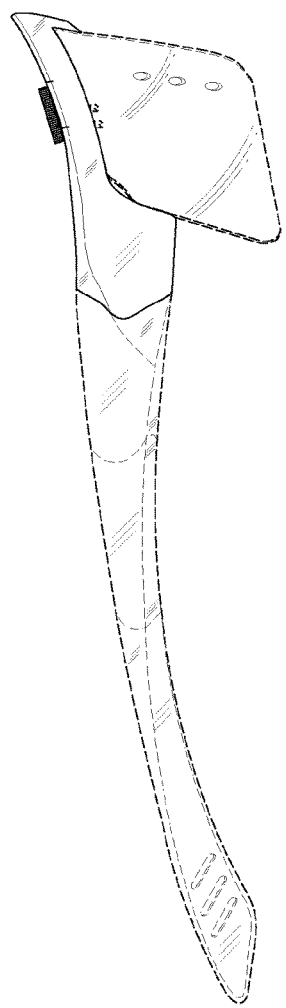

FIG. 9B is a front view of the design of FIG. 9A.
FIG. 9C is a back view of the design of FIG. 9A.
FIG. 9D is a left-side view of the design of FIG. 9A.
FIG. 9E is a right-side view of the design of FIG. 9A.

DETAILED DESCRIPTION OF THE INVENTION

The abovementioned and other features of the invention disclosed herein are described below with reference to the drawings of the preferred embodiments. While the present description sets forth specific details of various embodiments, it will be noted that the description is illustrative only and should not be construed in any way as limiting.
Definitions "Transparent" refers to either an opening or a transparent material. For example, a "see-through" section or opening within each lens or the use of a highly transparent material within a lens.

Figure 1:
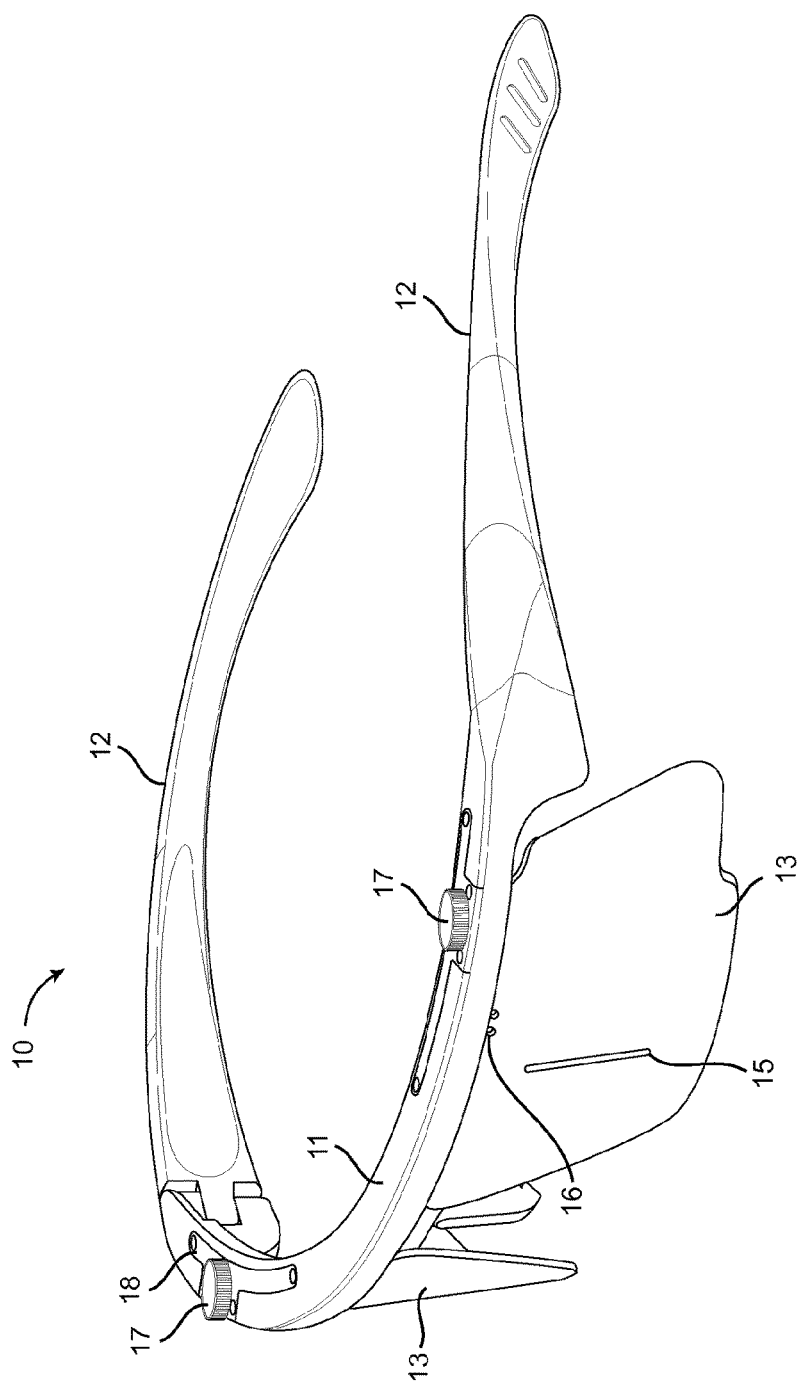
FIG. 1 shows a full side view of one embodiment of an eyewear device for improved athlete-ball alignment, reduced head movement and/or eye movement, increased focus on the ball, and improved performance.

"Horizontal" refers to the horizontal direction when the eyewear is worn (e.g., from the left lens to the right lens). For example, the vertical slits 15 shown in FIG. 1 are oriented perpendicular to horizontal (e.g., the slits are vertically oriented).

The invention relates to eyewear devices and methods of using the same to assist users enhance or improve the user's sports or athletic abilities.

In many athletic sports, the athlete needs to make contact with the ball within a critical striking region or "sweet spot". This can be challenging given the reduced hours of practice combined with normal distractions that cause the athlete to move his head and lose eye contact to 'the ball'. Methods for increasing the optical focus of the athlete have been described by others, but with limited actual success. In many cases, the athlete moves his head to "track the flight" or path of the ball, thereby decreasing his focus on the ball during the 'striking process'. Thus, the athlete loses optical focus on the ball and inadvertently causes a poor 'strike' with non-optimal flight of the ball. In golf, this is often seen as a 'miss' of the putt, errant swing on the open fairway or 'topping' the ball during the act of 'driving'.

Methods that help to train an athlete or to enhance the athlete's focus on the ball, therefore, can increase the player's success in 'cleanly' striking the ball and sending the ball on a more preferred trajectory to the target. In golf, this increased focus on the ball steadies the golfer's head, resulting in a better swing, cleaner contact of the ball and a better path to the desired target. Similar results might be expected in baseball, cricket, and tennis where the player uses a 'bat' or racket to directly contact the ball in flight. Increased eye-ball alignment and subsequent reduced head movement and/or eye movement are common requirements for many sports involving a player and a ball.

Methods or devices that restrict the athlete's view and help to focus the athlete's eyes on the ball, therefore, may result in better overall performance and higher achievement within that sport. Herein, a device and method for increasing an athlete's optical focus and optical alignment with the ball, by limiting the athlete's field of viewing, are described. In general, the device described herein can take several forms as might be expected by one skilled in the art of optical devices, such as glasses, goggles, visors, and headgear worn by the athlete to provide increased visual acuity during all sporting activities.

In human visual applications, the pupillary distance (PD) or inter-pupillary distance (IPD) is the distance, measured in millimeters, between the centers of the pupils in each eye. This distance is measured when preparing to make prescription eyeglasses. Positioning lenses correctly in relation to the center of the pupils is especially important for good optical viewing and visual acuity. It can also be relevant, for example, to binoculars that must be adjusted to better suit the user's IPD. Without the ability to align the viewing lens to the pupillary distance, the optical alignment when viewing a specific object may result in double images (double vision) or blurred vision.

In the prior art, golf glasses are disclosed in US Patent Publication No. 20120258814 to Kayama (hereby incorporated by reference), but the glasses as described as being useful for positional alignment of the player to the ball. Although an athlete's body position to the ball is important, it is more critical that the player's eye to ball alignment and head and eye movements are restricted during the act of contacting the ball (swing). By providing a limited viewing region, that is adjustable to the user's inter-pupillary distance, the optical view may be optimized leading to improved visual alignment and reduced head and eye movements. This has not specifically been described in the prior art of Kayama.

The present invention relates to a low-cost and simple approach to providing a device with the means for both the active and passive assistance of an athlete's eye alignment to the ball used in a given sporting activity. By restricting the athlete's field of view, the optical device of the invention provides an improved method for the athlete to visually focus on the ball, the eye to ball alignment, and the relative head-ball positioning. By limiting the field of optical view, an increased ability to focus or "see" the ball is achieved and thus, helps to steady the athlete's head movements. In this manner, the limited optical view leads to an improved 'strike' of the ball and better resulting performance within that sport. The device of the invention provides the athlete with a decreased field of view, forcing an increased visual alignment with the ball, leading to better performance in that sport.

One aspect of the invention relates to the use of small apertures in the athlete's vision path to assist in aligning the player's vision to the ball. By using small optical apertures, the player's vision is limited to the field of view and focus on the ball, thereby forcing the alignment of the player's eye to the ball. In this manner, the athlete can be either trained to focus on the ball, as a new player, or encouraged to focus more intently on the position of the ball, as an accomplished or professional athlete.

FIG. 1 shows a side view of an eyewear device 10 according to one embodiment of the invention including conventional eyewear components faceplate 11, temple pieces or arms 12 and lens 13. Eyewear device 10 further includes a slit aperture 15 in each lens 13 (preferably centered for alignment with the user's pupils) according to the invention adapted or configured to allow the user to improve the user's focus on an object (e.g., a golf ball) according to the invention. Preferably, eyewear device 10 includes an adjustment assembly including lens adjustment dial 17 and adjustment assembly component 18 that allows the lens 13 to be adjusted by the user to move the slit apertures 15 to align to improve the user's focus on the object (not shown). Lens 13 is preferably attached to adjustment assembly, directly or indirectly, via lens attachment component 16 which attaches to the lens via screws, plugs, glue, mechanically (e.g., snap-on mechanism) or other means for attaching and lens attachment component 16 moves when lens adjustment dial 17 is turned. Preferably, the movement of the lens 13 by the adjustment assembly reversibly locks the lens in place after each movement. Preferably, the lens adjustment dial 17 can be turned incrementally and preferably clicks with each incremental movement to help the user make small adjustments.

Figure 2:
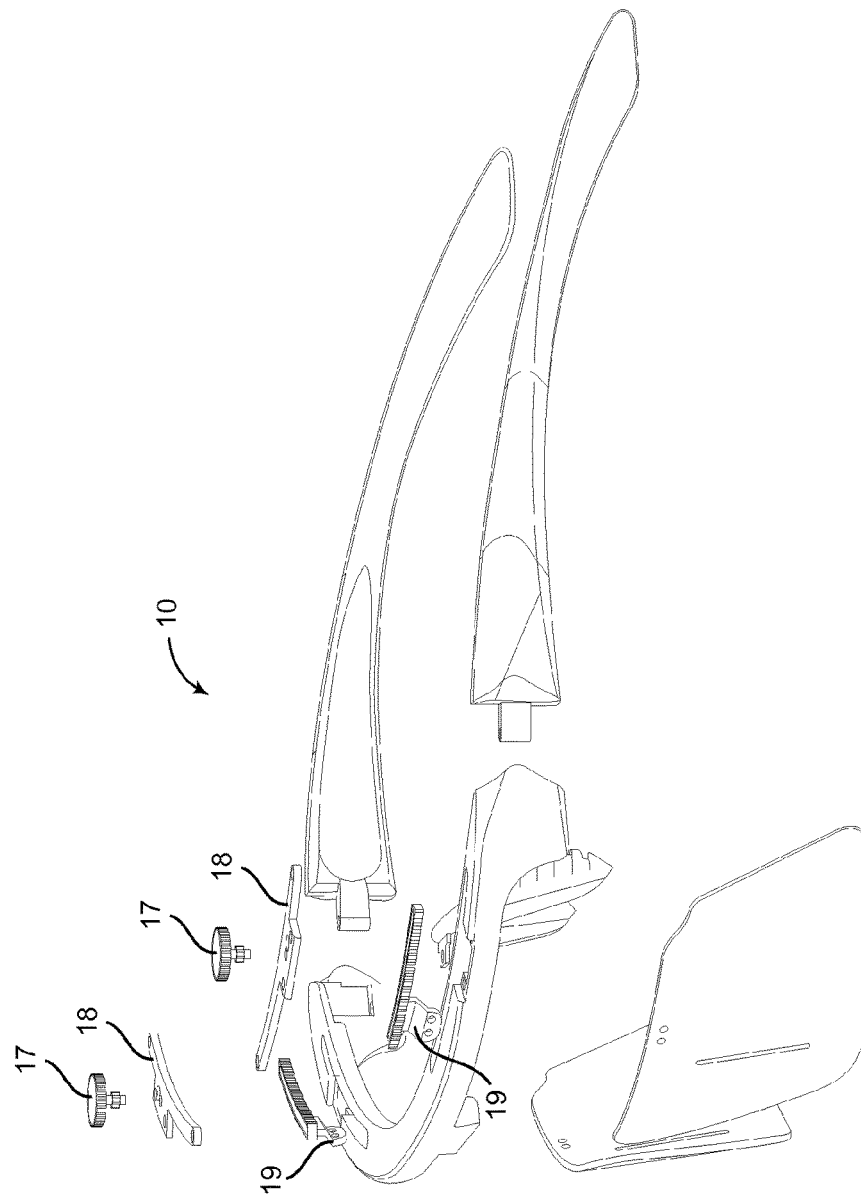
FIG. 2 shows a side view of a disassembled eyewear device of FIG. 1.

FIG. 2. is a dissembled side view of the eyewear device 10 of FIG. 1 showing disassembled lens adjustment platform 19 which is configured to be attached to the lens 13.

Figure 3:
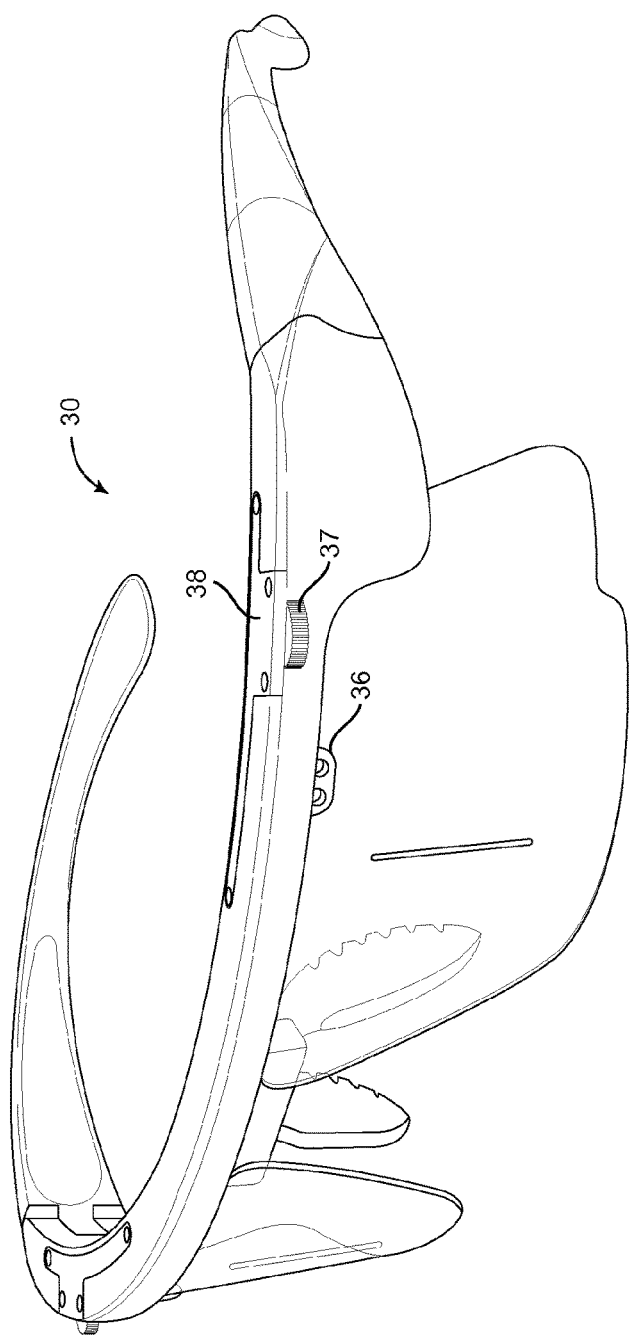
FIG. 3 shows a side view of another embodiment of the eyewear device for improved athlete-ball alignment, reduced head movement and/or eye movement, increased focus on the ball, and improved performance.

FIG. 3 is a front view of an eyewear piece 30 according to another embodiment of the invention having an adjustment dial 37 located in the front of the frame and lens attachment component 36 and lens adjustment assembly component 38.

Figure 4:
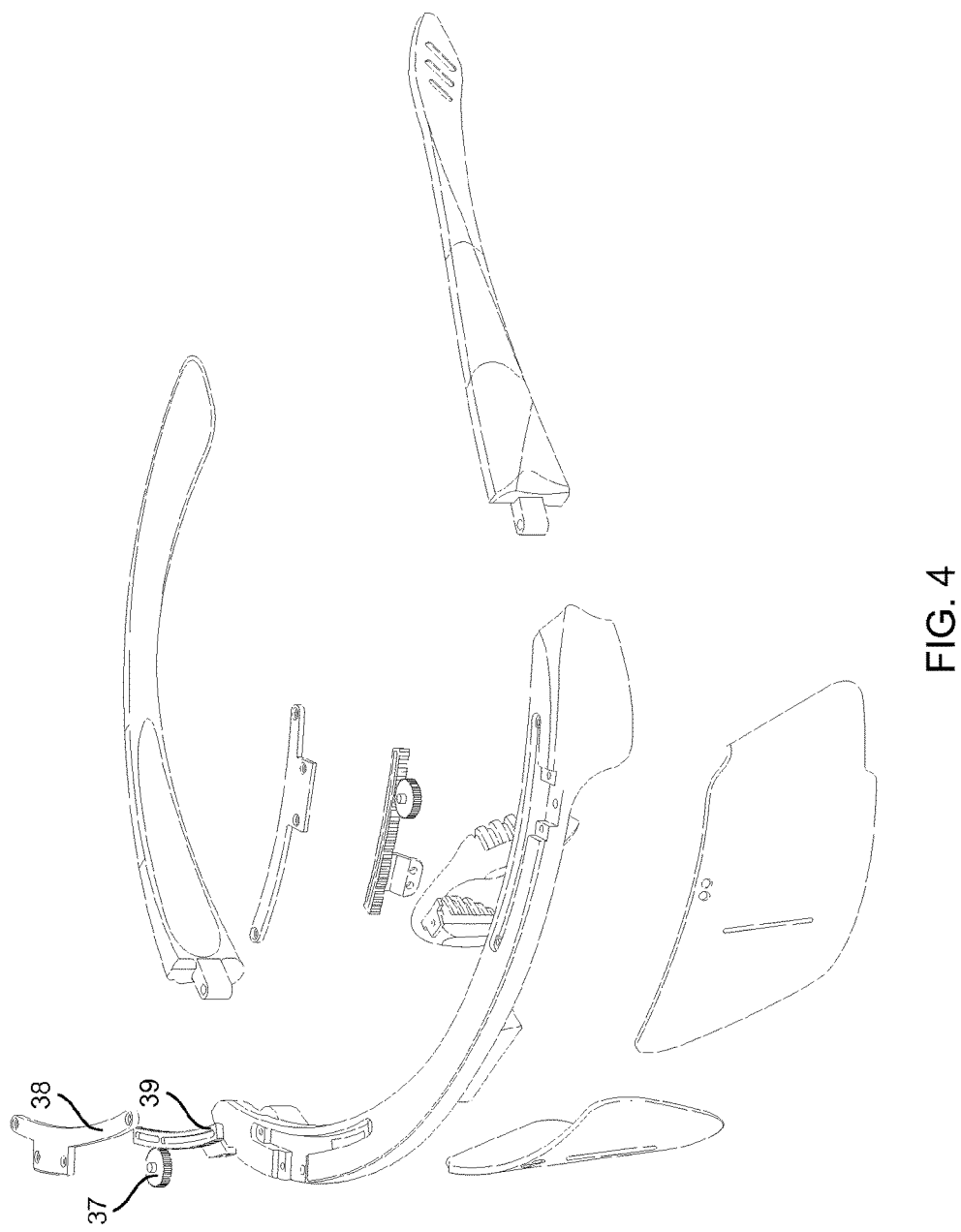
FIG. 4 shows a side view of a disassembled eyewear device of FIG. 3.

FIG. 4 is a dissembled view of the eyewear device 30 of FIG. 3 showing lens adjustment platform 39. Alternative embodiments of the invention including devices with the adjustment dials configured on the side of the frame, the back of the frame or the bottom of the frame. Lens attachment component 36 may be attached to the lens via plugs, screws, using VELCRO, glue, mechanically, magnetically or other means.

Figure 5:
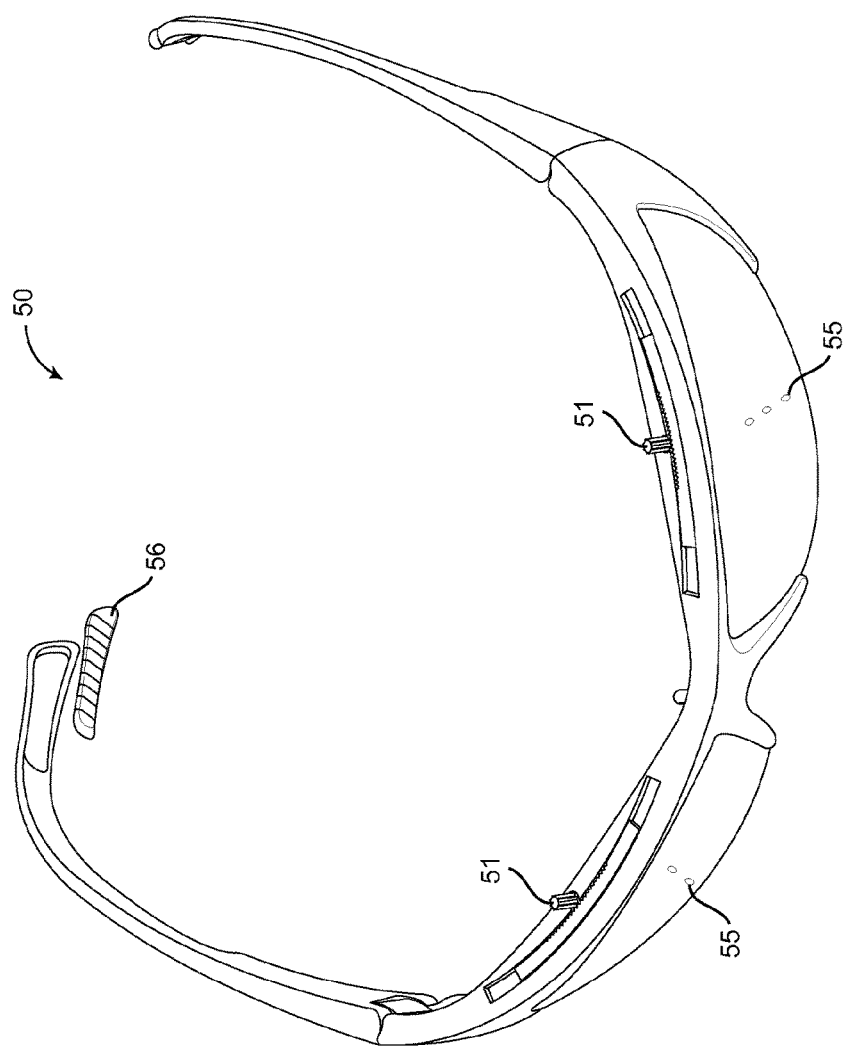
FIG. 5 shows a top view of another embodiment of the eyewear device for improved athlete-ball alignment, reduced head movement and/or eye movement, increased focus on the ball, and improved performance.

FIG. 5 is a top view of an eyewear piece 50 according to another embodiment of the invention having an adjustment component 51 and lens apertures 55. Adjustment component 51 can either comprise a dial that is turned to move the lens, a handle that is moved along a track by the user or other mechanism for moving the lens or moving the apertures 55 within the lens. Lens apertures 55 are shown with three vertical holes to provide an optically differentiated field of view for each lens according to the invention. Eyewear piece 50 optionally includes a removable temple piece pad 56 to improve comfort. Alternative embodiments may include two or more holes, square openings, rectangular openings, oval openings, triangular openings or the like. Alternatively, a material have a different transparency is used to provide the optically differentiated field of view for each lens.

According to another aspect of the invention, several apertures are vertically aligned to encourage the player's field of view and visual focus on the ball, prior to a 'strike' or contact with the object (ball). By forcing the player's vision within a limited field of view, as defined by the set of vertical apertures, the player is forced to focus only on the ball and it's positional location to the athlete.

According to a third aspect of the invention, a narrow vertical slit is provided within the player's viewing zone. The player is forced to view the ball within the narrow viewing zone or slit, thereby forcing visual alignment to the ball. Once the visual alignment is achieved by the player, via the focus of his eyes on the ball, the head of the athlete is also forced to align with the position of the ball. Any head and/or eye movements by the athlete may result in the loss of visual alignment to the ball. This limited field of visual focus, therefore, results in decreased head and/or eye movements and subsequently, improved performance during the strike on the ball.

According to a fourth aspect, optical clarity can be achieved by using optical color differences within the optical device, that allows the athlete to view the 'sweet' spot for viewing the ball. Color differences can be achieved by pigment changes in the optical device or by using polarized regions with the viewing optics. Thus, the use of colors, polarizers or other optical means for achieving optical differentiation, can be used in the optical device by known techniques, especially to those skilled in the art of optics and visual viewing devices.

According to a fifth aspect of the invention, the optical device consists of glasses, goggles, bifocals, sunglasses, a viewing visor, a head visor or eyepiece that can be worn on the athlete's head. Many different styles can be envisioned by those skilled in the art of producing optical viewing devices, as described herein and in the prior art. A key element of the invention is that the optical device contains a defined zone for enhanced optical viewing and improved visual alignment on an object used in that sporting activity.

According to a sixth aspect of the invention, the means for creating zones of optical differentiation can be achieved by use of an outer element (bi-layer), and inner element (bi-layer), or a region within a single element of construction, within the glasses, goggles, visor, eyepiece or optical device, as known or envisioned by those skilled in the art.

According to a seventh aspect of the invention, the device apertures can be used to train new athletes, junior athletes, young athletes, weekend athletes, professional athletes and accomplished athletes with an interest in learning, refining or improving their ability within that specific sport. Further, the object of the invention can be used for any sport, but is anticipated to have wide acceptance in golf, tennis and baseball, and sports where eye-hand and eye to ball alignment are key to achieving success in that sport.

According to an eighth aspect of the current invention, the user wears glasses with six small apertures within the field of view (three on the right eye lens, three on the left eye lens). The wearer can adjust the position of each lens by moving horizontally (left or right), to increase the alignment of the apertures to their own individual pupillary distance (distance between the two pupils) until the six apertures merge into one field of view to the wearer. This action is similar to that used in binoculars and known to those skilled in the art. When used in the sport of golf, the golfer stands over the golf ball, aligns the apertures to achieve a single view of the ball within the apertures. Movement of the golfer's head, after alignment of the apertures, will result in the loss of viewing alignment to the ball. This optical device, therefore, can be used for teaching, training, or in actual sports competition, and encourages the golfer to maintain his head in a "locked" position during the golf swing.

For athletes, either during training, in practice sessions, or during actual competition, the device improves eye to ball alignment, reduces head movement and/or eye movement, and increases the likelihood of a 'clean' ball strike. In golf, the device can be used especially in putting, chipping, and driving shots, where slight head movements result in poor ball flight and reduced performance. In one embodiment of this invention, the optical viewing device is a pair of shaded glasses with three vertical holes in each lens. In a second embodiment of the invention, the optical viewing device is a pair of shaded glasses with narrow vertical slits in each lens. In each embodiment, both the left and right viewing lenses can slide horizontally, thereby allowing adjustment of the inter-pupillary distance of the viewing regions to the user's head and specific pupil spacing distance. When the inter-pupillary spacing distance has been optimized, the eye to ball alignment sharpens in acuity and requires the athlete to restrict his head movement to maintain that visual alignment to the ball.

Thus, one embodiment of the invention relates to an eyewear device comprising:
(i) an eyewear frame;
(ii) a right lens and a left lens attached to the eyewear frame; and
(iii) an adjustment assembly,
wherein the right lens and the left lens each comprise at least one transparent region within the lens providing an optically differentiated field of view (or limited optical field of view) there through and wherein the adjustment assembly is adapted to horizontally adjust each of the at least one transparent region to align with a user's eye pupils and inter-pupillary distance.

Preferably, the at least one transparent region has an optical transmission which is clearly differentiated from the rest of the lens and preferably centered within the lens. This can be achieved by an opening (no material), a vertical series of openings, a change in material with varying optical properties or a region of different optical density within one material. Alternately, a different transparent color is used to differentiate the transparent region from the rest of the lens. The purpose of the regions for each lens is to focus the wearer's eyes on an object (e.g., golf ball) to control, for example, the wearer's head and/or eye movement. The use of transparent or different color regions within the center of each lens allows the user to focus the user's sight on a single object.

According to an alternative embodiment, vertical, circular or related lines or markings on each lens are configured to align the users eyes with the ball object.

Preferably, the regions can be adjusted. However, according to alternative embodiments, the spacing of the regions is set and sized for certain users. Accordingly, another embodiment of the invention relates to an eyewear device comprising: (a) an eyewear frame; and (b) a right lens and a left lens attached to the eyewear frame; wherein the right lens and the left lens each comprise at least one transparent region within the lens providing an optically differentiated field of view (or limited optical field of view) there through to align with a user's eye pupils and inter-pupillary distance.

Another embodiment relates to an eyewear device comprising an eyewear frame supporting a right lens and a left lens, wherein the right lens and the left lens each include at least one transparent region that can be horizontally adjusted to align with the inter-pupillary distance of a user and thereby provide an optically differentiated field of view for the user through each of the at least one transparent region.

Another embodiment of the invention relates to an eyewear device comprising:
(i) an eyewear frame;
(ii) a right lens and a left lens attached to the eyewear frame; and
(iii) an adjustment assembly for each lens, each adjustment assembly comprising a movable, preferably slidable, component adapted to hold each lens,
wherein the right lens and the left lens each comprise at least one transparent region providing an optically differentiated field of view there through and wherein each movable component is adapted to horizontally adjust each lens thereby aligning each transparent region with a user's eye pupils.

Another embodiment relates to a lens assembly for an eyewear system, the lens assembly including a right transparent vertical viewing region and a left transparent vertical viewing region, wherein the right transparent viewing region and the left transparent viewing region are configured to be horizontally adjusted to align with a user's eye pupils and inter-pupillary spacing. Preferably, each transparent vertical viewing region is centered within the left and right lens of the eyewear system.

Preferably, the spacing can be adjusted and "locked in" for individuals. That is, the spacing between the transparent regions adjusted and then reversibly locked in place allowing for future adjustments.

Another embodiment relates to an eyewear device comprising a right lens and a left lens, wherein the right lens and the left lens each comprise a vertically aligned transparent regions providing an optically differentiated field of view there through, wherein the vertically aligned transparent regions comprises at least three vertically aligned transparent regions.

The embodiments of the invention can be advantageously modified to provide additional benefits according to the following preferred embodiments.

According to one preferred embodiment, the eyewear device further comprises an adjustment assembly to horizontally adjust each transparent region. Preferably, the adjustment assembly comprises an adjustment turning dial to move each lens horizontally. Preferably, the adjustment assembly comprises a sliding mechanism to move each lens horizontally. Preferably, the adjustment assembly allows the adjustment to reversibly lock in place, specifically, the user can adjust the lens to the regions are spaced apart at a certain distance and that adjustment is held in place until the assembly is adjusted again by the user.

According to another preferred embodiment, the right lens and the left lens can each slide to align with the user's eye pupils.

According to another preferred embodiment, the right lens and the left lens are opaque except for the transparent region.

According to another preferred embodiment, the right lens and the left lens are shaded except for the transparent region.

According to another preferred embodiment, the right lens and the left lens comprises color variable polarization materials adapted to generate the transparent regions.

According to another preferred embodiment, each transparent region comprises a vertical slit or at least two vertically aligned transparent regions.

According to alternative embodiments, the transparent regions are replaced or used with markings on the lens to facilitate a user's head alignment.

According to another preferred embodiment, each transparent region can be adjusted to the user's inter-pupillary spacing distance for optimal visual alignment.

According to another preferred embodiment, the device is configured to enhance the user's eye to ball visual alignment achieved by the transparent regions in the user's viewing field of vision.

According to another preferred embodiment, the device is configured to be worn by the user to enhance the eye to ball alignment and steady the user's head position during use and to reduce the amount of the user's head and/or eye movements.

According to another preferred embodiment, each transparent region comprises two or more vertical transparent apertures used to align the user's eye to the a ball used in a sporting activity.

According to another preferred embodiment, each transparent region is comprised of transparent regions having a shape selected from the group consisting of spheres, ovals, circles, squares, rectangles, triangles or narrow slits providing specific regions for eye-ball alignment by the user.

According to another preferred embodiment, the device is configured to enhance the user's athletic training and performance for a sporting activity by wearing the eyewear device during the performance of that sporting activity.

According to another preferred embodiment, the inter-pupillary distance of the transparent regions can be independently adjusted to fit the user's pupil distance, allowing a clear single image of the ball, thereby providing increased eye-ball alignment and decreased head and eye movement to the user.

According to another preferred embodiment, the transparent regions on both lenses are narrow vertical slits that can be independently aligned through horizontal movement to provide an optimized inter-pupillary distance for a user of the optical device.

According to another preferred embodiment, the transparent regions are from 1-50 millimeters in height and 1-20 millimeters in width, more preferably 10-40 millimeters in height and 1-10 millimeters in width, even more preferably 15-30 millimeters in height and 2-6 millimeters in width, and most preferred approximately 25 millimeters in height (+/−1 mm) and approximately 1 millimeters (+/−0.5 mm) in width.

According to another preferred embodiment, the transparent regions are 30 millimeters in height and 5 millimeters in width and when aligned to the inter-pupillary distance of a user provide a single image of a ball in high visual acuity.

According to another preferred embodiment, the transparent regions are 25 millimeters in height and 3 millimeters in width and when aligned to the inter-pupillary distance of a user provide a single image of a ball in high visual acuity.

According to another preferred embodiment, the transparent regions are 20 millimeters in height and 1 millimeter in width and when horizontally aligned to the inter-pupillary distance of a user provides a single image of a ball in high acuity.

According to another preferred embodiment, the transparent regions are on an external surface, an internal surface or embedded within the overall optical device to be worn by the athlete.

According to another preferred embodiment, the device is head-worn glasses, goggles, visor, attachment or other visual enhancement device for a single user.

According to another preferred embodiment, the transparent regions can be aligned to a user's head, to compensate for the size, shape and distance separating the eyes of the user.

According to another preferred embodiment, the device is constructed from polymeric materials.

According to another preferred embodiment, the optical polymeric materials used to construct the device may be colored, patterned, mirrored, polarized or processed for specific vision requirements of the user.

According to another preferred embodiment, the low-cost polycarbonates are used to construct the optical device in the form of head-worn glasses, goggles, visors, attachment or other visual enhancement device.

Another embodiment of the invention relates to eyewear systems wherein the assembly comprises for each lens a lens platform for holding the lens and a lens adjustment mechanism including a lens adjustment dial. Preferably, the lens adjustment mechanism is attached to the eyewear frame. Preferably, the lens platform comprises an elongated portion having teeth along its length adapted to interact with a gear having teeth attached to the lens adjustment dial and turning the lens adjustment dial turns the gear moving the lens platforms relative to the lens adjustment mechanism. Preferably, the lens platform and a component of the lens adjustment mechanism interlock via corresponding teeth and turning the lens adjustment dial moves the lens platforms relative to the lens adjustment mechanism.

According to another embodiment, the adjustment assembly comprises at least one lens adjustment dial having a gear with gear teeth corresponding to teeth on a component holding the lens. Preferably, the lens adjustment dial is on the eyewear frame top. Preferably, the lens adjustment dial is on the eyewear frame front. Preferably, the lens adjustment dial is on the eyewear frame side or back.

Accordingly to another embodiment, the adjustment assembly comprises a sliding mechanism and an external knob and each of the at least one transparent region is adjusted by sliding the knob moving at least one of the lens or the at least one transparent region. Preferably, the knob is on the eyewear frame top, on the eyewear frame back, or on the eyewear frame front.

Preferably, the adjustment assembly comprises a first component for holding the lens and having a surface having teeth corresponding to teeth on a surface of the eyewear frame or on a surface of a second component attached to the eyewear frame and the first component and the second component are adapted to move horizontally relative to one another allowing for the adjustment of the transparent regions relative to the eyewear frame.

According to another embodiment, the right lens and the left lens are adapted to be inserted onto the eyewear frame and each comprise a lens body have an elongated tab at one end allowing the lens to be secured onto a nosepiece and arms of the eyewear device. Preferably, the right lens and the left lens are removable from the eyewear device. Preferably, the right lens and the left lens are flexible. Preferably, the right lens and the left lens are flexed when being inserted onto the eyewear device.

Figure 6A:
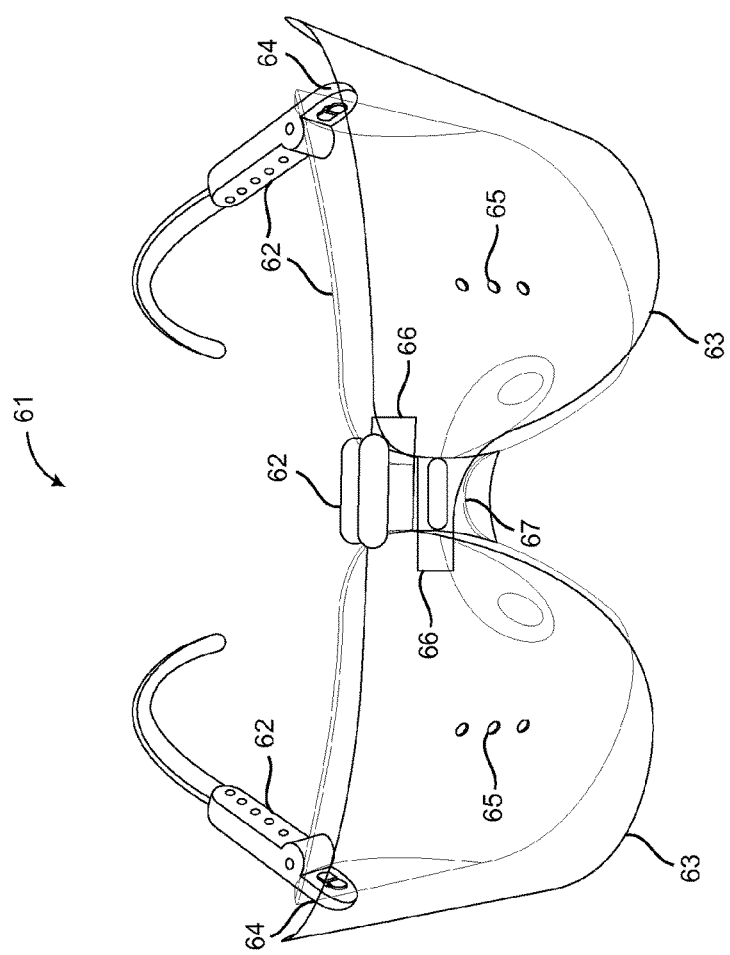
FIG. 6A shows a front view of another embodiment of the eyewear device for improved athlete-ball alignment, reduced head movement and/or eye movement, increased focus on the ball, and improved performance
Figure 6B:
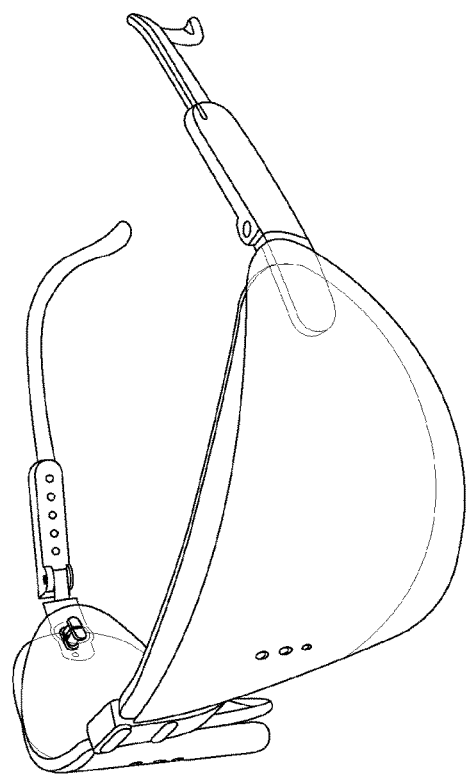
FIG. 6B shows a side view of a disassembled eyewear device of FIG. 6A.
Figure 6C:
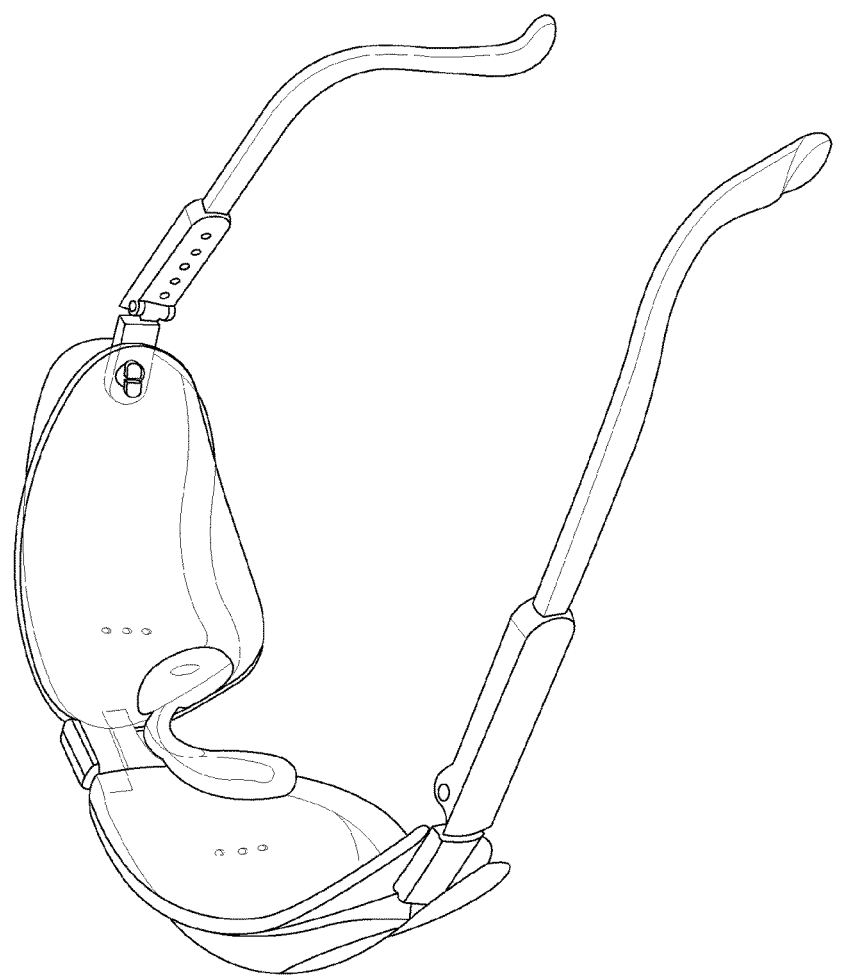
FIG. 6C shows a rear view of a disassembled eyewear device of FIG. 6A.

FIGS. 6A-6C show an eyewear system 61 according to one embodiment of the invention including removable lens 63 having the innovative features and functionality of the present invention. FIG. 6A is a front view showing removable lens 63 inserted onto an eyewear frame 62 (including conventional eyewear lens). Each removable lens 63 comprises three vertical apertures 65 according to the invention to provide the optically differentiated field of view for each lens. Each lens 63 is attached to the eyewear device using elongated tabs 66 inserted across the nosepiece 67. Preferably, each lens 63 is configured or adapted to be manually adjusted by moving each lens closer or farther apart from the other in a horizontal movement. Preferably, the end of each lens 63 closer to nosepiece 67 is reversibly attached to the eyewear frame either mechanically, magnetically, using VELCRO™, or similar means. Preferably the other ends of each lens 63 attaches to the side 64 of the eyewear frame 62 either mechanically, magnetically, using VELCRO™, or similar means or by the shape of the lens 63. FIG. 6B is a side view of the eyewear system 61 of FIG. 6A. FIG. 6C is a rear view of the eyewear system 61 of FIG. 6A.

Another embodiment of the invention relates to an eyewear lens system comprising a right lens and a left lens each having at least one transparent region within the lens providing an optically differentiated field of view there through and wherein the right lens and the left lens are adapted to be inserted onto the eyewear frame and adjusted horizontally to align the transparent regions with the inter-pupillary distance of a user. One preferred embodiment relates to a kit comprising, in one or more containers, the lens and written instructions for using the invention. According to another preferred embodiment, the lens are "clip-on" or "flip-down" lens that either attach to a user's eyewear frame mechanically (e.g., via hooks), magnetically or via other attachment means.

Another aspect of the invention relates to methods of using the eyewear devices of the invention to improve the performance of individuals.

One embodiment relates to methods of using the eyewear device of the invention comprising a user wearing the eyewear device, adjusting the distance between the vertically aligned transparent regions to align with the inter-pupillary distance of the user, and engaging in a sporting activity with improved eye-to-ball alignment using the device.

Another embodiment of the invention relates to a method of using an eyewear device comprising a right lens and a left lens, wherein the right lens and the left lens each comprise a vertically aligned transparent region providing an optically differentiated field of view there through, the method comprising horizontally aligning the vertically aligned transparent regions, thereby allowing adjustment of the inter-pupillary distance of the viewing regions to a user's head and specific pupil spacing distance thereby allowing the user to restrict head movement to maintain visual alignment to the ball.

According to one preferred embodiment, the method comprises enhancing sports performance by wearing an optical alignment device that results in reduced head movement and/or eye movement in the athlete wearing the optical device.

According to another preferred embodiment, the method comprises improving sports performance by wearing an optical alignment device in which the user aligns the optical viewing regions of each lens independently to the athlete's inter-pupillary distance and thereby provides a single image of the ball. This alignment leads to increased athlete eye to ball alignment and greatly reduced head movement and/or eye movement.

According to another preferred embodiment, the method comprises improving new athletes or junior athletes performance by wearing an optical alignment device that results in reduced head movement and/or eye movement in the athlete or player wearing the optical enhancement device.

According to another preferred embodiment, the method comprises improving or enhancing sports performance by wearing an optical alignment device comprised of head-worn glasses with vertical apertures that are spheres, squares, rectangles, triangles, or slits.

According to another preferred embodiment, the method comprises teaching or training young athletes by improving eye-ball alignment and reduced head movement and/or eye movement when wearing an optical alignment device, such as glasses with vertical transparent apertures.

According to another preferred embodiment, the method comprises enhancing sports performance by wearing an optical alignment device that results in reduced head movement and/or eye movement in the athlete or player wearing the optical enhancement device, after horizontal adjustment of the narrow vertical slits in the head-worn glasses.

According to another preferred embodiment, the method comprises enhancing sports performance by wearing an optical alignment device that results in reduced head movement and/or eye movement in the athlete or player wearing the optical enhancement device, after horizontal adjustment of the vertical spherical apertures in the head-worn glasses.

According to another preferred embodiment, the method comprises enhancing sports performance by wearing an optical alignment device comprised of head-worn glasses with vertical apertures that are an external layer, an internal layer, or embedded in the optical alignment device or glasses.

Another embodiment relates to a method for using the head-worn optical device by horizontally aligning both the left and right viewing lenses, thereby allowing adjustment of the inter-pupillary distance of the viewing regions to the user's head and specific pupil spacing distance. When the inter-pupillary spacing distance has been optimized, the eye to ball alignment sharpens in acuity and requires the athlete to restrict his head movement and/or eye movement to maintain that visual alignment to the ball. Preferably, the method comprises enhancing sports performance by wearing an optical alignment device that results in reduced head movement in the athlete wearing the optical device. Preferably, the method comprises enhancing sports performance by wearing an optical alignment device in which the user aligns the optical viewing regions of each lens independently to the athlete's inter-pupillary distance and thereby provides a single image of the ball. This alignment leads to increased athlete eye to ball alignment and greatly reduced head movement and/or eye movement. Preferably, the method comprises enhancing new athletes or junior athletes performance by wearing an optical alignment device that results in reduced head movement and/or eye movement in the athlete or player wearing the optical enhancement device. Preferably, the method comprises enhancing sports performance by wearing an optical alignment device comprised of head-worn glasses with vertical apertures that are spheres, squares, rectangles, triangles, or slits. Preferably, the method comprises teaching or training young athletes by improving eye-ball alignment and reduced head movement and/or eye movement when wearing an optical alignment device, such as glasses with vertical transparent apertures. Preferably, the method comprises enhancing sports performance by wearing an optical alignment device that results in reduced head movement and/or eye movement in the athlete or player wearing the optical enhancement device, after horizontal adjustment of the narrow vertical slits in the head-worn glasses. Preferably, the method comprises enhancing sports performance by wearing an optical alignment device that results in reduced head movement and/or eye movement in the athlete or player wearing the optical enhancement device, after horizontal adjustment of the vertical spherical apertures in the head-worn glasses. Preferably, the method comprises enhancing sports performance by wearing an optical alignment device comprised of head-worn glasses with vertical apertures that are an external layer, an internal layer, or embedded in the optical alignment device or glasses.

In the preferred embodiment of the invention, the athlete wears alignment glasses with a viewing window that allows for an adjustable inter-pupillary distance (IPD) within the narrow vertical viewing region. The alignment of the vertical viewing regions, on both lenses, allows the athlete to see a clear 'single' view of the ball when the IPD has been optimized for the athlete. This visual alignment forces the athlete's to hold his head in a static viewing position. In this manner, the optical alignment and optical view reinforces the need for reduced head movement and/or eye movement, during use and during contact with the ball.

In the preferred embodiment, the dimensions of the vertical viewing region, on each lens, is thirty millimeters (30 mm) or less in the vertical height and five millimeters (5 mm) or less in the width of the vertical opening. In the most preferred embodiment, the vertical viewing region on each lens is twenty millimeters (20 mm) in the vertical dimension and one millimeter (1 mm) in the viewing width for the transparent opening. A key element of the invention and all of the various embodiments described herein, is the ability to independently position the transparent viewing regions to the users inter-pupillary distance, thereby allowing a clear 'single' view of the ball. This, in turn, allows for an increased eye to ball alignment and reduced head movement and/or eye movement during use by the athlete.

For athletes, either during training, in practice sessions, or during actual competition, the device improves eye to ball alignment, reduces head movement and/or eye movement, and increases the likelihood of a 'clean' ball strike. In golf, the device can be used especially in putting, chipping, and driving shots, where slight head and/or eye movements result in poor ball flight and reduced performance. In one embodiment of this invention, the optical viewing device is a pair of shaded glasses with three vertical holes in each lens. In a second embodiment of the invention, the optical viewing device is a pair of shaded glasses with narrow vertical slits in each lens. In each embodiment, both the left and right viewing lenses can slide horizontally, thereby allowing adjustment of the inter-pupillary distance of the viewing regions to the user's head and specific pupil spacing distance. When the inter-pupillary spacing distance has been optimized, the eye to ball alignment sharpens in optical acuity and requires the athlete to restrict his head movement and/or eye movement to maintain the optimum visual alignment to the ball.

FIGS. 7-9 show ornamental designs for the eyewear systems according the invention.

FIG. 7A is a side view of one ornamental design according to one embodiment of the invention. FIG. 7B is a front view of the design of FIG. 7A. FIG. 7C is a rear view of the design of FIG. 7A. FIG. 7D is a left side view of the design of FIG. 7A. FIG. 7E is a right side view of the design of FIG. 7A. Alternative ornamental designs according to the invention include the design of FIGS. 7A-E with the three vertical lines at the ends of temple piece drawn with broken lines. Another alternative ornamental design according to the invention includes the design of FIGS. 7A-E with the horizontal designs on the nosepiece or the entire nosepiece drawn with broken lines. Another alternative ornamental design according to the invention includes the design of FIGS. 7A-E with the temple pieces drawn with broken lines. An additional alternative ornamental design according to the invention includes the design of FIGS. 7A-E with the two attachment holes drawn with broken lines. An additional alternative ornamental designs according to the invention includes the design of FIGS. 7A-E with the vertical slit aperture in each lens lines replaced with two or three or four or five vertical openings (similar to FIGS. 9A-9E).

FIG. 8A is a side view of another ornamental design according to another embodiment of the invention. FIG. 8B is a front view of the design of FIG. 8A. FIG. 8C is a rear view of the design of FIG. 8A. FIG. 8D is a left side view of the design of FIG. 8A. FIG. 8E is a right side view of the design of FIG. 8A. Alternative ornamental designs according to the invention include the design of FIGS. 8A-E with the front eyewear frame drawn with broken lines and only the vertical holes and adjustment dial shown in solid lines. Additional alternative ornamental designs according to the invention include the design of FIGS. 7A-E with the two attachment holes drawn with broken lines. Additional alternative ornamental designs according to the invention include the design of FIGS. 8A-E with the vertical slit aperture in each lens replaced with two or three or four or five vertical openings (similar to three openings shown FIGS. 9A-9E).

FIG. 9A is a side view of another ornamental design according to another embodiment of the invention. FIG. 9B is a front view of the design of FIG. 9A. FIG. 9C is a rear view of the design of FIG. 9A. FIG. 9D is a left side view of the design of FIG. 9A. FIG. 9E is a right side view of the design of FIG. 9A. Alternative ornamental designs according to the invention include the design of FIGS. 9A-E with the front eyewear frame drawn with broken lines and only the vertical holes and dial shown in solid lines. Additional alternative ornamental designs according to the invention include the design of FIGS. 9A-E with the two attachment holes drawn with broken lines. Additional alternative ornamental designs according to the invention include the design of FIGS. 9A-E with the three vertical apertures in each lines replaced with two or four or five vertical openings or where the openings are circular, oval, rectangular, square, triangular or elongated.

Still further alternative designs according to the invention include the designs described above with the adjustment dial placed on the front or back or side of the eyewear frame.

The broken lines shown in FIGS. 7-9 or described above merely illustrate the environment of the design and are not part of the claimed design. The broken lines are for illustrative purposes and form no part of the claimed design. Moreover, any shading is provided to illustrate contour only and is not an indication of texture, gloss, etc.

Other embodiments of this invention may be envisioned by those skilled in the art and are anticipated by technical improvements in ophthalmology and the visual sciences. Other methods for creating the vertical optical viewing region may also be envisioned by those skilled in the art.

Although the invention has been described relative to specific embodiments thereof, there are numerous variations and modifications that will be readily apparent to those skilled in the art in light of the above teachings. It is therefore to be understood that, within the scope of the appended claims, the invention may be practiced other than as specifically described.

With respect to the appended claims, unless stated otherwise, the term "first" does not, by itself, require that there also be a "second". While the particular compositions, formulations, products and methods described herein and described in detail are fully capable of attaining the above-described objects and advantages of the invention, it is to be understood that these are the presently preferred embodiments of the invention and are thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular means "one or more" and not "one and only one", unless otherwise so recited in the claim.

It will be appreciated that modifications and variations of the invention are covered by the above teachings and within the purview of the appended claims without departing from the spirit and intended scope of the invention.

The invention claimed is:

1. An eyewear device comprising:
   an eyewear frame;
   a right lens and a left lens attached to the eyewear frame; and
   an adjustment assembly, wherein the right lens and the left lens each comprise at least one transparent region within the lens providing an optically differentiated field of view there through, wherein each lens of the right lens and the left lens are in an initial position, wherein the adjustment assembly is adapted to separately horizontally adjust each of the at least one transparent region to align with a user's eye pupils and inter-pupillary distance based on moving one or more or the right lens and the left lens from the initial position to a new position, wherein the adjustment assembly comprises a first gear with teeth coupled to the right lens via a first lens attachment component and a second gear with teeth coupled to the left lens via a second lens attachment component, wherein the first gear and the second gear can each be turned separately, by the user, to move the right lens and the left lens, respectively, individually, in a horizontal direction from the right lens to the left lens or from the left lens to the right lens, wherein turning the first gear moves the right lens from the initial position to the new position, and wherein turning the first gear does not move the left lens from the initial position.

2. The eyewear device of claim 1, wherein the adjustment assembly comprises an adjustment turning dial to move each lens individually horizontally.

3. The eyewear device of claim 1, wherein the adjustment assembly comprises a sliding mechanism to move each lens individually horizontally.

4. The eyewear device of claim 1, wherein the right lens and the left lens can each slide separately to align each of the at least one transparent region with the user's eye pupils.

5. The eyewear device of claim 1, wherein the right lens and the left lens are shaded except for the transparent region.

6. The eyewear device of claim 5, wherein the right lens and the left lens comprise color variable polarization materials adapted to form the transparent regions.

7. The eyewear device of claim 5, wherein each transparent region is comprised of transparent regions having a shape selected from the group consisting of: sphere, ovals, circles, squares, rectangles, triangles and narrow splits providing specific regions for eyeball alignment by the user.

8. The eyewear device of claim 5, wherein the at least transparent region is on an external surface of, an internal surface of or embedded within the right lens and the left lens.

9. The eyewear device of claim 5, wherein the eyewear device comprises optical polymeric materials to form the at least one transparent region and the optical polymeric materials used to construct the device may be colored, patterned, mirrored, polarized or processed for specific vision requirements of the user.

10. The eyewear device of claim 5, wherein the assembly comprises for each lens platform for holding the lens and a lens adjustment mechanism including a lens adjustment dial.

11. The eyewear device of claim 10, wherein the lens platform comprises and elongated portion having teeth along its length adapted to interact with a the first gear, the first gear moving the lens platform relative to the lens adjustment mechanism.

12. The eyewear device of claim 10, wherein the lens platform and a component of the lens adjustment mechanism interlock via corresponding teeth and turning the lens adjustment dial moves the lens platform relative to the lens adjustment mechanism.

13. The eyewear device of claim 5, wherein the adjustment assembly comprises a sliding mechanism and an external knob and each of the at least one transparent region is adjusted by sliding the knob moving at least one of the lens or the at least one transparent region.

14. The eyewear device of claim 13, wherein said adjustment assembly comprises a first component for holding the lens and having a surface having teeth corresponding to teeth on a surface of the eyewear frame and the first component and the second component are adapted to move horizontally relative to one another allowing for the individual adjustment of the transparent regions relative to the eyewear frame.

15. A method of using an eyewear device, comprising:
   positioning, by a user, the eyewear device on a face of the user such that the user is wearing the eyewear device as a pair of glasses, the eyewear device comprising:
   an eyewear frame;
   a right lens and a left lens attached to the eyewear frame; and
   an adjustment assembly, wherein the right lens and the left lens each comprise at least one transparent region within the lens providing an optically differentiated field of view there through, wherein each lens of the right lens and the left lens are in an initial position, wherein the adjustment assembly is adapted to separately horizontally adjust each of the at least one transparent region to align with a user's eye pupils and inter-pupillary distance based on moving one or more or the right lens and the left lens from the initial position to a new position, wherein the adjustment assembly comprises a first gear with teeth coupled to the right lens via a first lens attachment component and a second gear with teeth coupled to the left lens via a second lens attachment component, wherein the first gear and the second gear can each be turned separately, by the user, to move the right lens and the left lens, respectively, individually, in a horizontal direction from the right lens to the left lens or from the left lens to the right lens, wherein turning the first gear moves the right lens from the initial position to the new position, and wherein turning the first gear does not move the left lens from the initial position; and adjusting, by the user, the distance between the at least one transparent region of the right lens and the left lens to align with the inter-pupillary distance of the user; and engaging, by the user, in a sporting activity involving a ball with improved eye-to-ball alignment using the eyewear device.

16. An eyewear device comprising:

an eyewear frame;

a right lens and a left lens attached to the eyewear frame; and an adjustment assembly, wherein the right lens and the left lens each comprise a transparent vertical slit aperture within each lens providing an optically differentiated field of view there through, wherein each lens of the right lens and the left lens are in an initial position, wherein the adjustment assembly is adapted to enable a user wearing the eyewear device to horizontally adjust each of the transparent vertical slit apertures, while wearing the device, to align with the user's eye pupils and inter-pupillary distance by moving the vertical split apertures to align to improve the user's focus on an object based on moving one or more or the right lens and the left lens from the initial position to a new position, wherein the adjustment assembly comprises at least one adjustment turning dial coupled to each lens of the right lens and the left lens to enable the user to move each lens of the right lens and the left lens, separately, horizontally, wherein horizontally comprises a horizontal direction when the eyewear device is worn by the user, from the left lens to the right lens or from the right lens to the left lens, wherein turning an adjustment dial of the at least one adjustment turning dial coupled to the right lens moves the right lens from the initial position to the new position and does not move the left lens from the initial position.

\* \* \* \* \*

UNITED STATES PATENT AND TRADEMARK OFFICE
CERTIFICATE OF CORRECTION

Page 1 of 1

PATENT NO. : 10,379,385 B2
APPLICATION NO. : 14/780741
DATED : August 13, 2019
INVENTOR(S) : Lamorte et al.

It is certified that error appears in the above-identified patent and that said Letters Patent is hereby corrected as shown below:

In the Claims

Column 15, Line 60: Claim 6, Delete "claim 5" and insert -- claim 1 --

Column 15, Line 63: Claim 7, Delete "claim 5" and insert -- claim 1 --

Column 16, Line 1: Claim 8, Delete "claim 5" and insert -- claim 1 --

Column 16, Line 4: Claim 9, Delete "claim 5" and insert -- claim 1 --

Column 16, Line 10: Claim 10, Delete "claim 5" and insert -- claim 1 --

Column 16, Line 24: Claim 13, Delete "claim 5" and insert -- claim 1 --

Signed and Sealed this
Nineteenth Day of November, 2019

Andrei Iancu
*Director of the United States Patent and Trademark Office*